Aug. 19, 1947.                F. E. CARLSON                2,425,863
                        LIGHT PROJECTION APPARATUS
                          Filed May 18, 1945
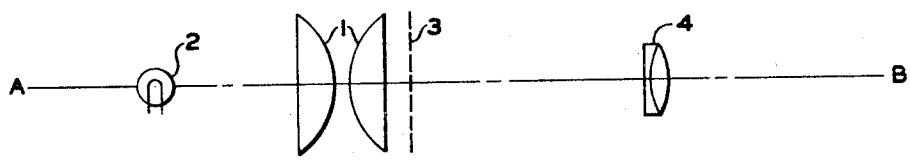
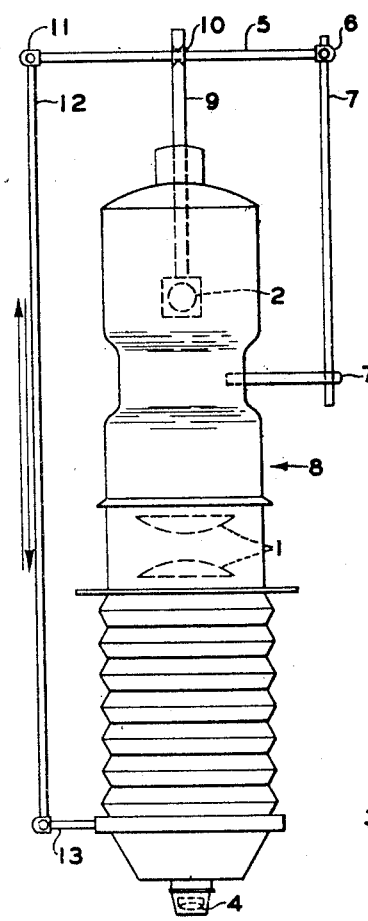
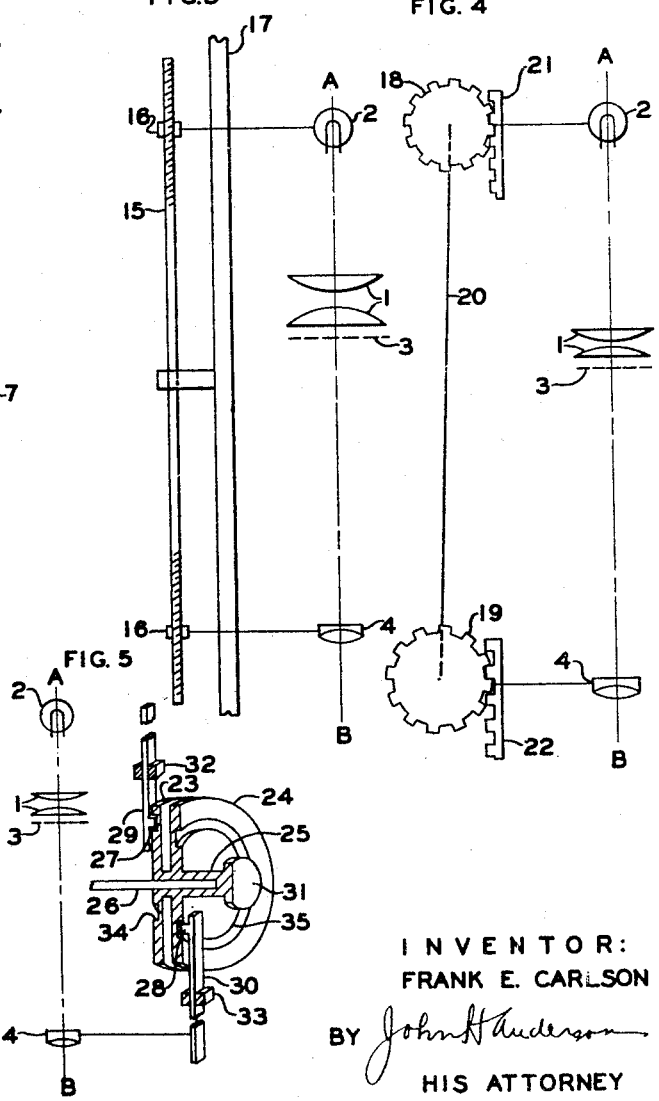
INVENTOR:
FRANK E. CARLSON
BY John H. Anderson
HIS ATTORNEY Patented Aug. 19, 1947

2,425,863

UNITED STATES PATENT OFFICE 2,425,863

LIGHT PROJECTION APPARATUS

Frank E. Carlson, Cleveland Heights, Ohio, assignor to General Electric Company, a corporation of New York Application May 18, 1945, Serial No. 594,512

1 Claim. (Cl. 88—24)

My invention relates to lantern slide projectors and photographic enlargers and its principal object is to provide automatic means for properly positioning the light source for efficient utilization and to obtain acceptable uniformity of illumination on the screen or easel when the projection lens is moved along the optical axis of the illuminating system to focus the projected image on the screen or easel for different projection distances. Other objects and advantages of my invention will appear from the following detailed description of species thereof.

In the accompanying drawing species of my invention are shown in which Fig. 1 is a diagrammatic view of a conventional lens system of a lantern slide projector or photographic enlarger; Fig. 2 is a side elevational view of the lamp and lens housing of a conventional enlarger and a species of my new means for properly adjusting the light source mounted in the housing; Fig. 3 is a diagrammatic view of another species of my invention; Fig. 4 is a similar view of still another species of my invention, and Fig. 5 is a fragmentary, partly sectional, perspective view of another species of adjusting means.

The lens system shown in Fig. 1 of the drawing is typical of that used in both lantern slide projectors and photographic enlargers. The only significant difference in the optical elements of the two types of devices is in the focal lengths of the lenses and the position of the optical axis A—B of the system which is usually approximately horizontal in the slide projectors and approximately vertical in photographic enlargers.

The lens system comprises a pair of condenser lenses 1 which increase the amount of light from the lamp 2 passing through the slide 3 and change the direction of the light so that light passing through all points of the slide 3 will pass through the projection lens 4. The projection lens is adjustable along the optical axis A—B for focusing the projected image on the screen or easel (not shown) the distance of which from the projection lens may be different at different times. The most uniform illumination on the screen or easel is obtained when the image of the light source 2 appears substantially in the plane of the projection lens 4. Thus, when the projection lens 4 is moved in focusing, the light source 2 must also be moved to properly place the image of the light source to obtain maximum, uniform illumination on the screen. Because of the characteristics of the lenses, the light source must be moved away from the condenser lenses 1 as the projection lens 4 is moved toward them. In other words the light source 2 and the projection lens 4 must move in the same general direction so that as the distance of one of these elements from the condenser lenses 1 increases the distance of the other element from the condenser lenses decreases.

The light source 2 may be moved for proper adjustment in the usual lantern slide projector but few users of such equipment know how to make the adjustment. Further, the adjustment of the source has to be made independently. Hence, the adjustment is seldom made and the quality of screen illumination is usually poorer than the best obtainable with the equipment. It is possible to mount the source 2 in a fixed position only when its size is considerably larger than that required for its image to fill the projection lens. This is common practice in condenser-type enlargers in which incandescent lamps having diffusing glass bulbs are used as the light source. However, in order to obtain sufficient source brightness in such enlargers a much higher wattage than can be effective in contributing light to the projected image must be used. Dissipating the heat generated by the high wattage lamp in such enlargers presents a serious problem. If the size of the source is reduced to that which may be most efficiently utilized the wattage may be reduced to approximately ⅓ or ¼ of that now used or if the same wattage is used the printing speed can be increased 3 or 4 times.

I have discovered that for all possible degrees of enlargement with a commercial enlarger of the condenser type there is an approximately linear relation between the distance of the source from the condensing lenses and the distance of the projection lens from the condensing lenses. In the light of this discovery I have provided a mechanical linkage between the projection lens and the light source to move the source into its proper position automatically as the projection lenses are moved in focusing.

One type of linkage is shown in Fig. 2 of the drawing and comprises a lever arm 5 pivoted at one end 6 on a fixed support 7 attached to the housing or casing 8 for the lamp and the lenses of a conventional photographic enlarger. The usual supporting frame for the housing 8 and other parts of the enlarger have been omitted from the drawing for simplicity of illustration. The lever arm 5 passes through a transverse opening in a connecting rod 9 which rod passes through a bushing or sleeve in housing 8 and is joined to a conventional movable mount for the lamp 2, as shown in dotted lines. The diameter of part 10 of arm 5 which engages rod 9 is slightly smaller than the smallest diameter of the opening in rod 9 and the said opening decreases in diameter inwardly from each end. This arrangement of the engaging parts of rod 9 and arm 5 permits movement of the free end 11 of arm 5 along an arcuate path to move rod 9, guided by the bushing in housing 8, and therewith lamp 2 along the optical axis of the enlarger.

The free end 11 of arm 5 is attached to a connecting rod 12 by a pivot joint and the connecting rod 12 is attached by a similar joint to a rigid arm 13 affixed to the usual movable support or mount for the projection lens 4. Thus, as the projection lens 4 is moved relative to the condenser lenses 1 and along the optical axis of the enlarger in focusing the projected image, the free end 11 of arm 5 is moved through a vertical arc to move rod 9 and lamp 2 the proper distance along the optical axis so that the image of the lamp 2 remains focused on the projection lens 4 as the latter is moved. Easily releasable holding means may be provided on the supporting frame of the enlarger for firmly holding the linkage means in position after adjustment has been made.

If the average distance between the pivoted end 6 and the part 10 of lever arm 5 is represented by the letter Y and the average distance between the said part 10 and the free end 11 of the lever arm 5 as X then the relative average rates of movement of the lamp and the projection lens are established by the ratio $$\frac{Y}{X+Y}$$

In a commercial type of enlarger known as the "Omega D II" equipped with a linkage means of the type shown in Fig. 2 the distance from the pivot point at end 6 of arm 5 to the part 10 engaging rod 9 was 5⅝ inches and the distance from said part 10 to the pivot point at ends 11 was 6 inches.

In Fig. 3 of the drawing another type of linkage is shown diagrammatically and comprises a rotatable shaft 15, threaded at both ends and engaged by threaded collars 16 attached to the lamp support and the part of the casing supporting the projection lens 4. The relative rates of movement of the lamp 2 and lens 4 in the same direction along the optical axis A—B are established by the ratio between the turns per inch of the threads at the ends of the shaft 15 when linear relationship is desired. For non-linear relationships, the same arrangement using followers instead of threaded collars, can be employed. The shaft 15 may be journaled to the stationary frame 17 of the photographic enlarger.

The linkage shown in Fig. 4 comprises two wheels 18 and 19 of different diameter interlocked by a rotatable shaft 20 to rotate in synchronism and connected by a pair of racks 21 and 22 to the lamp mount and the projection lens support, respectively. The ratio between the radii of the wheels 18 and 19 determines the relative rates of movement of the lamp 2 and the projection lenses 4 in the same direction along the optical axis A—B. The wheels 18 and 19, the connecting shaft 20 and the racks 21 and 22 may be mounted on the usual support frame of the enlarger.

In Fig. 5 of the drawing I have illustrated a means by which either linear or non-linear rates of motion between the lamp 2 and the projection lens 4 may be obtained. The means is useful in conjunction with projection equipment of the type identified above or of the type in which non-linear rates of movement are required to adjust the lamp so that the image of its filament is in the plane of the projection lens in all positions of the latter.

The means comprises two cams 23 and 24 affixed to a common sleeve 25 which is mounted for rotation on a fixed shaft 26 which may be attached to the frame of the enlarger. The cams 23 and 24 actuate followers 27 and 28, respectively, which are connected to two shafts 29 and 30, respectively. A hand turnable focusing knob 31 is attached to the sleeve 25 so that rotation of the knob 31 rotates the cams 23 and 24 and moves the shafts 29 and 30 longitudinally to focus the projection lens 4 and simultaneously adjust the lamp 2 connected to the shafts 29 and 30, respectively. Guides 32 and 33 may be provided on the supporting frame of the enlarger or projector for limiting the movement of the shafts 29 and 30 to the desired direction.

The cam surfaces 34 and 35 which the followers 27 and 28 engage establish the relative rates of movement of the lamp and the projection lens. These surfaces may be so arranged that linear or non-linear rates of movement of the lamp 2 and the projection lens 4 may be obtained to properly adjust the lamp 2 so that the image of its filament is in the plane of the projection lens when the latter is moved.

What I claim as new and desire to secure by Letters Patent of the United States is:

In a photographic enlarger comprising a housing supporting a light source and a projection lens in spaced relation on separately and axially movable mounts and supporting also condenser lenses between said source and said projection lens for focusing an image of said source in said projection lens, linkage means comprising a lever having one end pivoted on said housing, its free end coupled to the mount for the projection lens and a portion between its ends coupled to the mount for said source whereby the said mounts are movable axially and simultaneously in the same direction but at different rates such that the image of the source remains focused on the projection lens as the latter is moved.

FRANK E. CARLSON.

REFERENCES CITED

The following references are of record in the file of this patent:

UNITED STATES PATENTS

| Number | Name | Date |
| --- | --- | --- |
| 2,203,658 | Schubert | June 4, 1940 |
| 1,496,427 | Nelson | June 3, 1924 |
| 2,194,384 | Dewey | Mar. 9, 1940 |
| 2,361,667 | Tessier | Oct. 31, 1944 |
| 1,720,011 | Stark | July 9, 1929 |
| 1,020,371 | Schwanhausser | Mar. 12, 1912 |
| 1,573,314 | Goldberg et al. | Feb. 16, 1926 |
| 2,243,084 | Browne | May 27, 1941 |

FOREIGN PATENTS

| Number | Country | Date |
| --- | --- | --- |
| 826,102 | France | Dec. 27, 1937 |